US006913335B2

(12) United States Patent
Martinez

(10) Patent No.: US 6,913,335 B2
(45) Date of Patent: Jul. 5, 2005

(54) METHODS AND APPARATUS FOR IMAGE TRANSFER TO MULTIPLE ARTICLES HAVING NON-PLANAR SURFACES

(76) Inventor: Raul Martinez, 3303 East Miraloma Ave. Suite 187, Anaheim, CA (US) 92806

( * ) Notice: Subject to any disclaimer, the term of this patent is extended or adjusted under 35 U.S.C. 154(b) by 123 days.

(21) Appl. No.: 10/438,115

(22) Filed: May 14, 2003

(65) Prior Publication Data

US 2003/0202022 A1 Oct. 30, 2003

Related U.S. Application Data

(63) Continuation-in-part of application No. 09/877,828, filed on Jun. 8, 2001, now Pat. No. 6,746,093.

(51) Int. Cl.[7] .............................. B41J 3/00; B65B 1/04; B23C 1/14; B23B 3/36

(52) U.S. Cl. .............................. 347/2; 347/104; 141/1; 409/165; 82/152

(58) Field of Search ............................ 347/2, 104, 105, 347/106, 1, 4; 101/248, 55, 34, 38.1; 82/117, 118, 152; 142/1; 409/165

(56) References Cited

U.S. PATENT DOCUMENTS 5,831,641 A * 11/1998 Carlson ......................... 347/2

* cited by examiner

*Primary Examiner*—Juanita Stephens
(74) *Attorney, Agent, or Firm*—Steins & Associates, P.C.

(57) ABSTRACT

Methods and Apparatus for Image Transfer to Multiple Articles Having Non-planar Surfaces are disclosed. Also disclosed is an apparatus that utilizes a modified microprocessor-based printer. The apparatus has end portions and at least one intermediate portion for holding two or more three-dimensional articles for printing images thereon. The apparatus further includes holding cups for securely gripping the ends of the three-dimensional articles while the images are being transferred thereto. The apparatus is further adjustable in order to accommodate articles having differing lengths.

20 Claims, 6 Drawing Sheets

METHODS AND APPARATUS FOR IMAGE TRANSFER TO MULTIPLE ARTICLES HAVING NON-PLANAR SURFACES

This application is a continuation-in-part of application Ser. No. 09/877,828, filed Jun. 8, 2001 now U.S. Pat. No. 6,746,093, and the disclosure of that application is incorporated herein by reference.

BACKGROUND OF THE INVENTION

1. Field of the Invention

This invention relates generally to printing on non-planar surfaces and, more specifically, to Methods and Apparatus for Image Transfer to Multiple Articles Having Non-planar Surfaces.

2. Description of Related Art

Various types of image transfer techniques have been suggested in the past for imprinting images on a number of different material surfaces including cloth, wood, metal and ceramics. A very common technique, which has been widely used, is silk screening. The problem with silk screening is that it is generally limited to printing on smooth, flat surfaces. Furthermore, even on flat surfaces, the silk screening process produces a relatively low quality print when compared to that produced by lithography, gravure, letterpress sublimation and laser printing.

For imaging on metal surfaces, sublimation techniques are often used. An example of the prior sublimation processes can be found in Blake, U.S. Pat. No. 3,484,342 issued Dec. 16, 1969 and Fromson et al, U.S. Pat. No. 4,201,821 issued May 6, 1980; both Blake and Fromson suggest decorating unsealed and uncoated anodized aluminum using sublimation techniques. Sublimation processes, like screen printing, also suffer from being limited to flat, smooth surfaces. Transferring an image or graphic to a sphere or curved, cylindrically tapered surface by sublimation is extremely difficult, and such an approach, if achievable at all, would typically result in a poor quality, highly distorted image.

When printing on non-planar surfaces has been required, several techniques have been suggested. An example process is that disclosed by Stirbis et al, U.S. Pat. No. 4,941,266; the Stirbis apparatus (for decorating a cylindrical can) makes use of a multiple station ink supply and transfer apparatus for transferring ink from an in fountain to a rotatable inking blanket wheel through a plate cylinder. The Stirbis apparatus further includes an ink image registration adjustment apparatus and an axial and circumferential tightness control apparatus operatively associated with each plate cylinder and each ink supply and transfer apparatus. There have been additional prior techniques suggested for imprinting images on non-planar surfaces (including electro photographic imaging and magnetic imaging), but these techniques have met with limited commercial success.

Another prior system, Carlson, U.S. Pat. No. 5,831,641 discloses a method and apparatus for imprinting images on non-planar surfaces, including the surfaces of various types of three-dimensional articles, such as baseball bats. The Carlson apparatus includes a modified ink jet plotter coupled with an article positioning apparatus which functions to automatically maintain the surface of the article to be printed within a plane substantially parallel to and slightly spaced apart from the place within which the ink jet nozzles of the ink jet plotter reside.

Another prior art technique, which is frequently used to decorate surfaces, such as those from anodized aluminum, involves the use of transfer films. These films typically overlay the metal surface and undesirably, are subject to film deterioration and unattractive abrasion. A very popular prior art printing technique, which has found wide acceptance in recent years, is ink jet printing. Within the past several years, this technology has become the dominant technology for printing color images and graphics in the office and home markets. Ink jet printing basically involves a process whereby ink particles are projected in a continuous stream toward the surface to be imprinted using appropriate computer control to create text and graphics on the printing substrate. A number of different types of ink jet printers/plotters are readily commercially available from sources such as Calcomp, Packard Bell, NEC Technologies and Mutoh America, Inc.

As will be better understood from the discussion which follows, the method and apparatus of the present invention overcomes most of the problems encountered in prior art attempts to print high quality, detailed images on non-planar surfaces by employing a uniquely modified prior art ink jet image transfer technique.

SUMMARY OF THE INVENTION

In light of the aforementioned problems associated with the prior devices and methods, it is an object of the present invention to provide Methods and Apparatus for Image Transfer to Multiple Articles Having Non-planar Surfaces. The apparatus should utilize a modified microprocessor-based printer. The apparatus should have end portions and at least one intermediate portion for holding two or more three-dimensional articles for printing images thereon. The apparatus should further include holding cups for securely gripping the ends of the three-dimensional articles while the images are being transferred thereto. The apparatus should be adjustable to accommodate articles having differing lengths.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide Methods and Apparatus for Image Transfer to Multiple Articles Having Non-planar Surfaces.

Figure 1:
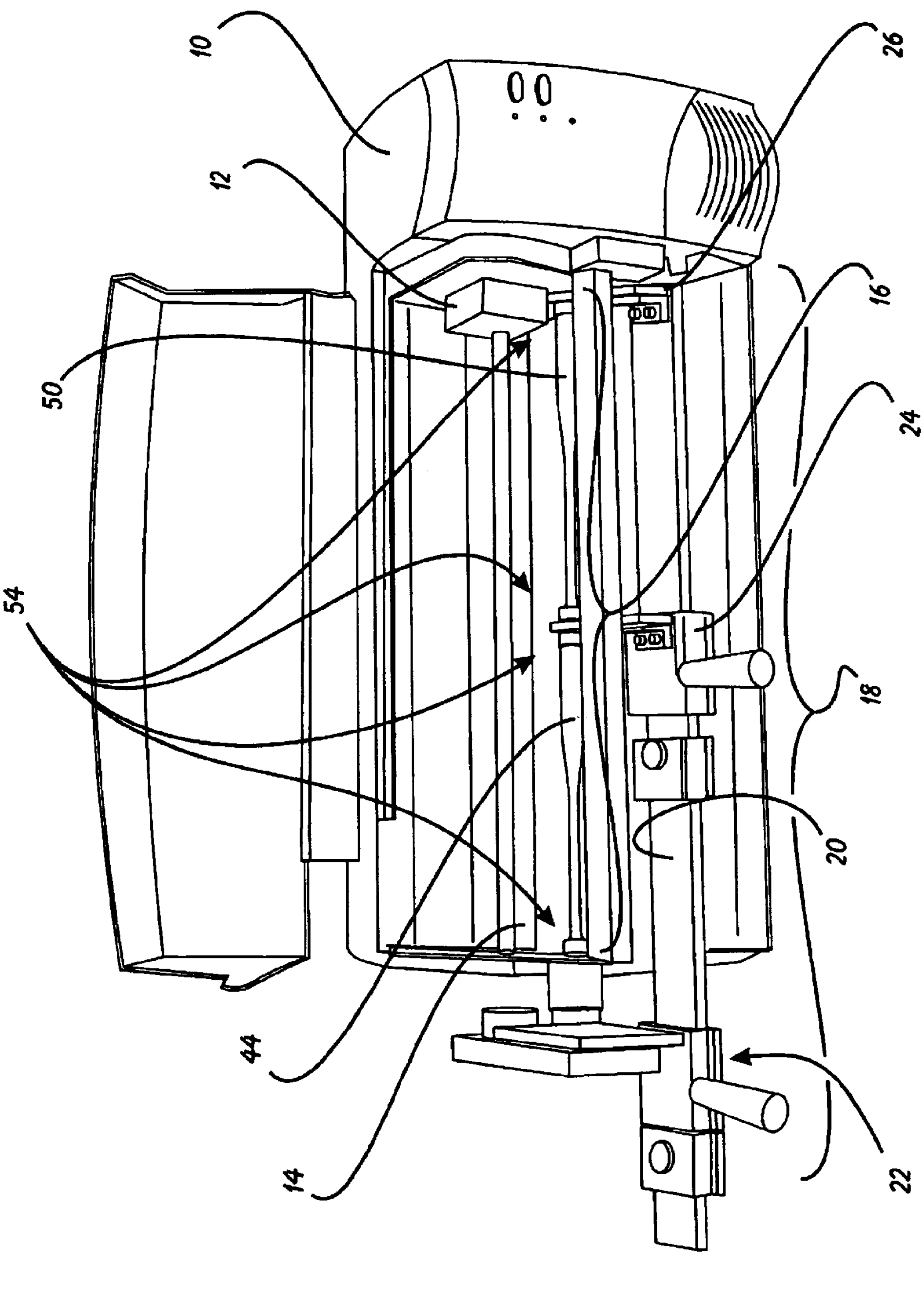
FIG. 1 is front view of a conventional ink jet printer that has been modified to permit the printing on a pair of three-dimensional articles using a preferred embodiment of the present invention.

The present invention can best be understood by initial consideration of FIG. 1. FIG. 1 is front view of a conventional ink jet printer 10 that has been modified to permit the printing on a pair of three-dimensional articles using a preferred embodiment of the present invention. As was discussed in the parent application to the present application, the printer 10 has been modified to replace its original drive assemblies and mechanisms (i.e. those designed for printing on sheets of paper and the like) with the article positioning assembly 18 depicted herein.

The article positioning assembly 18 of this invention differs for that disclosed and claimed in the parent to this application at least two ways: (1) the apparatus for grasping the three-dimensional articles has been simplified; and (2) the present design can grasp at least two separate three-dimensional articles at the same time—this expedites the imaging process by allowing a single print run to create an image on two or more articles.

This new assembly 18 comprises a guide 20 running substantially along the entire width of the print zone 16 (and perhaps even beyond the print zone, as will be discussed below). The guide 20 is in a plane that is separate from the print zone's plane (the print guide 14 is in the print zone's plane), but parallel and in spaced relation thereto. Attached to, and extending upwardly from the guide 20 is a first end portion 22 for both holding one end of a first three-dimensional article (not shown). In this embodiment, the apparatus that drives the article positioning assembly 18 to rotate the articles is attached adjacent to the first end portion 22, and thereby drives one end of one of the three-dimensional articles (not shown).

Approximately midway along the length of the guide 20 is located an intermediate portion 24. The intermediate portion 24 includes, among other things, apparatus configured to grasp the second end of the aforementioned first three-dimensional article (not shown). The intermediate portion 24 also includes apparatus configured to grasp the first end of a second three-dimensional article (not shown). The intermediate portion 24 will permit the two article-ends that it is grasping to rotate freely at the same rate; in other words, if the drive means (not shown) causes the first article (not shown) to rotate, then this will drive the element(s) of the intermediate portion 24 that grasp the first three-dimensional article (not shown) to rotate, which in turn will cause the first end of the second three-dimensional article (not shown) to rotate. In embodiments where necessary, additional intermediate portions 24 may be added to the system in order to enable the article positioning assembly 18 to grasp and drive three or more three-dimensional articles to rotate. This would be particularly desirable for small three-dimensional articles such as bat-shaped pens among many, many others. If we now turn to FIG. 2, we can examine another novel and nonobvious portion of the system of the present invention.

Figure 2:
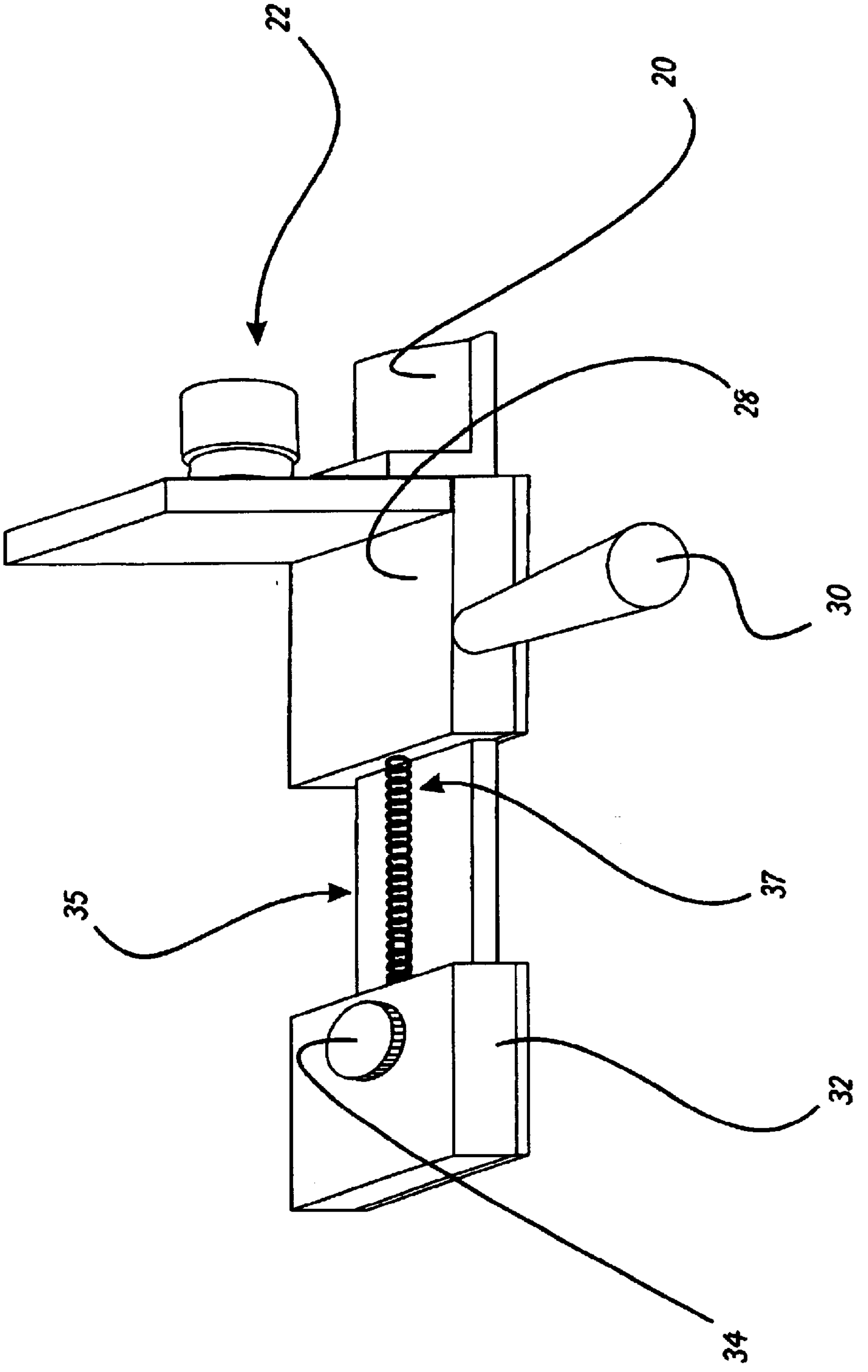
FIG. 2 is a top perspective view of the area of the first end portion of the device of FIG. 1.

FIG. 2 is a top perspective view of the area of the first end portion 22 of the device 18 of FIG. 1. The guide 20 terminates at one end at the first end portion 22. The first end portion 22 comprises, in pertinent part, a first adjustment block assembly 32 and a first carriage assembly 28. The first adjustment block assembly 32 is a block, slidably engaged to the guide 20, that further includes a set screw 34 or other braking means for preventing the adjustment block assembly 32 from sliding along the guide (i.e. to hold it in place firmly).

The first end portion 22 further comprises a first carriage assembly 28 that also slidingly engages the guide 20. The first carriage assembly 28 further includes the means for grasping the first end of the first three-dimensional article (not shown). The first carriage assembly 28 further includes a handle 30 that conveniently extends outwardly from a set screw (not shown). The carriage assembly 28 set screw (not shown) performs the identical purpose as the adjustment block assembly 32 set screw 34 for the carriage assembly 28.

Extending from the first adjustment block assembly 32, in the direction of the first carriage assembly 28 is a alignment pin 35 and biasing device 37, such as the spring shown. The alignment pin 35 serves to retain the biasing device 37 in position, as well as to engage an aperture (not shown) formed in the side of the carriage assembly 28. Although outwardly a simple design, the adjustment block—carriage assembly interoperation is elegant and functional.

In operation, the user (after first having set the intermediate portion in its desired position), next sets the first carriage assembly 28 in position such that a first three-dimensional article (not shown) is held between the first carriage assembly 28 and the intermediate portion (not shown); the handle 30 is then turned to tighten the set screw (not shown) such that the carriage assembly 28 is held in place firmly along the guide 20. Next, the user slides the first adjustment block 32 along the guide 20 until it is close to, yet separated somewhat from the first carriage assembly; the biasing device 37 is preferably in physical contact with the side of the first carriage assembly 28 (and the alignment pin 35 is most likely partially inserted into the aperture formed in the side of the carriage assembly 28). The set screw 34 is then turned to fix the first adjustment block assembly in place.

When it is time to remove and/or replace the three-dimensional article in the printing device (such as upon completion of the printing process), the user need simply loosen the set screw by turning the handle 30, then grasp the handle 30, and slide the first carriage assembly 28 to the left (as, shown here). When the carriage assembly moves a sufficient amount, the three-dimensional article will drop out of the grasping devices (see below).

In order to insert a new, like-sized three-dimensional article, the first carriage assembly 28 is held against the biasing device 35; the three-dimensional article is held in place between the grasping devices (see below), and the handle 30 is released. Once the handle 30 is released, the biasing device 37 will urge the first carriage assembly 28 to the right (in this drawing) until it is holding the three-dimensional article (not shown) in its grasping device (see below); the user then needs simply to turn the handle 30 until the set screw (not shown) holds the first carriage assembly 28 securely in place along the guide 20. If we now turn to FIG. 3, we can examine yet another novel and nonobvious aspect of the present invention.

Figure 3:
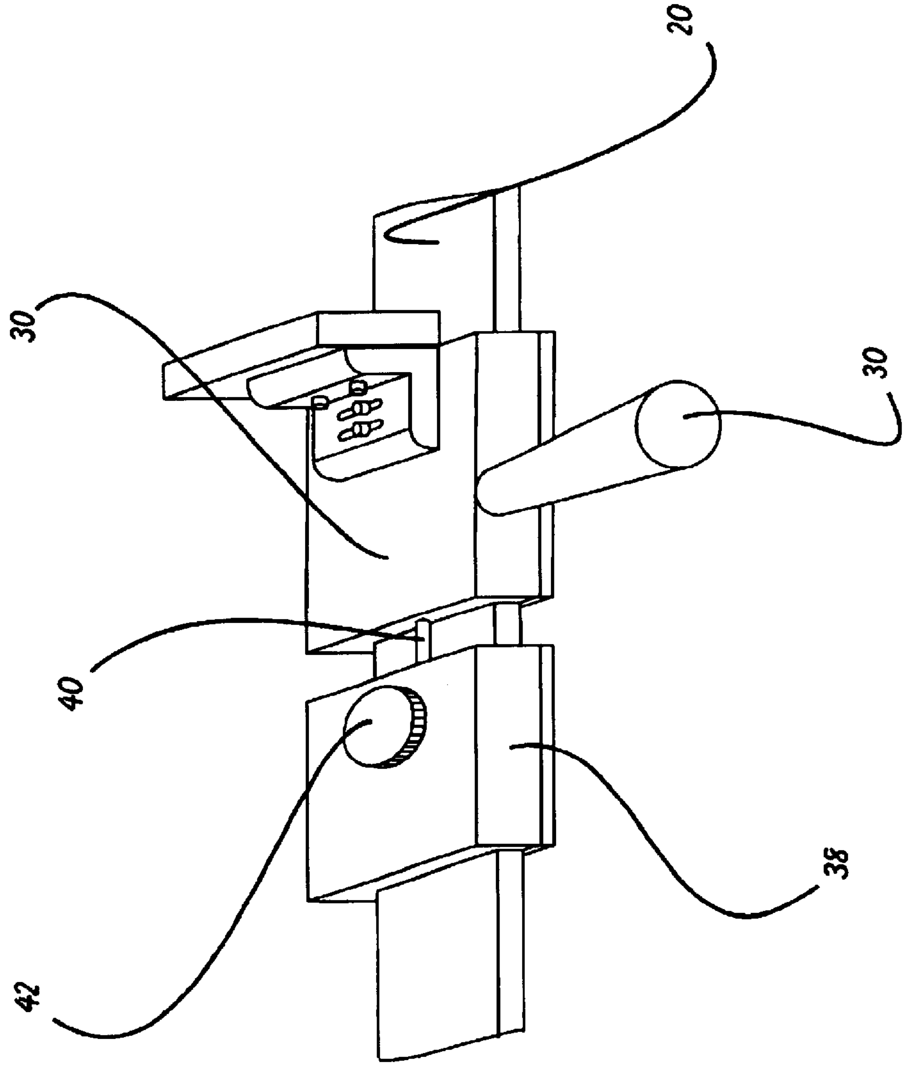
FIG. 3 is a top perspective view of the area of the intermediate portion of the device of FIGS. 1 and 2.

FIG. 3 is a top perspective view of the area of the intermediate portion 24 of the device of FIGS. 1 and 2. The intermediate portion 24 comprises two major sections: the second carriage assembly 36 and the second adjustment block assembly 38. The second carriage assembly 36, like the previously-described first carriage assembly includes a handle 30 extending from a set screw (not shown), that is operable to hold the carriage assembly 36 in place along the guide 20.

Similar to the first adjustment block assembly (see above), the second adjustment block assembly 38 includes a set screw for holding the second adjustment block assembly 38 in place along the guide 30. Also similarly, the second adjustment block assembly 38 has an alignment pin 40 extending therefrom for engagement with an aperture (not shown) formed in the side of the second carriage assembly 36. Unlike the first adjustment block assembly (see above), however, there is no biasing device necessary between the second adjustment block 38 and the second carriage assembly 36. The reason for this is that once a first three-dimensional article is placed between the first end portion (see FIG. 2) and the intermediate portion 24, the biasing device of the first end portion (see FIG. 2) will provide the biasing force (through the first three-dimensional article) to the second carriage assembly 36.

As with the first end portion (see FIG. 2), the adjustment block 38 is set in place with a slight gap between it and the set position of the first carriage assembly 36; in order to remove and replace the second three-dimensional article (not shown), the user need simply loosen the set screw using the handle 30, and momentarily slide the second carriage assembly 36 to the left (as depicted here). Once the user has placed the fresh three-dimensional article in place, he or she need simply release the handle, resulting in the biasing action (translating through the first three-dimensional article) holding the second three-dimensional article (not shown) in the holding cups (see below). This action is extremely convenient and rapid. Having discussed these two important sections in detail independently, we shall now turn to FIG. 4 to review their inter-relationship.

Figure 4:
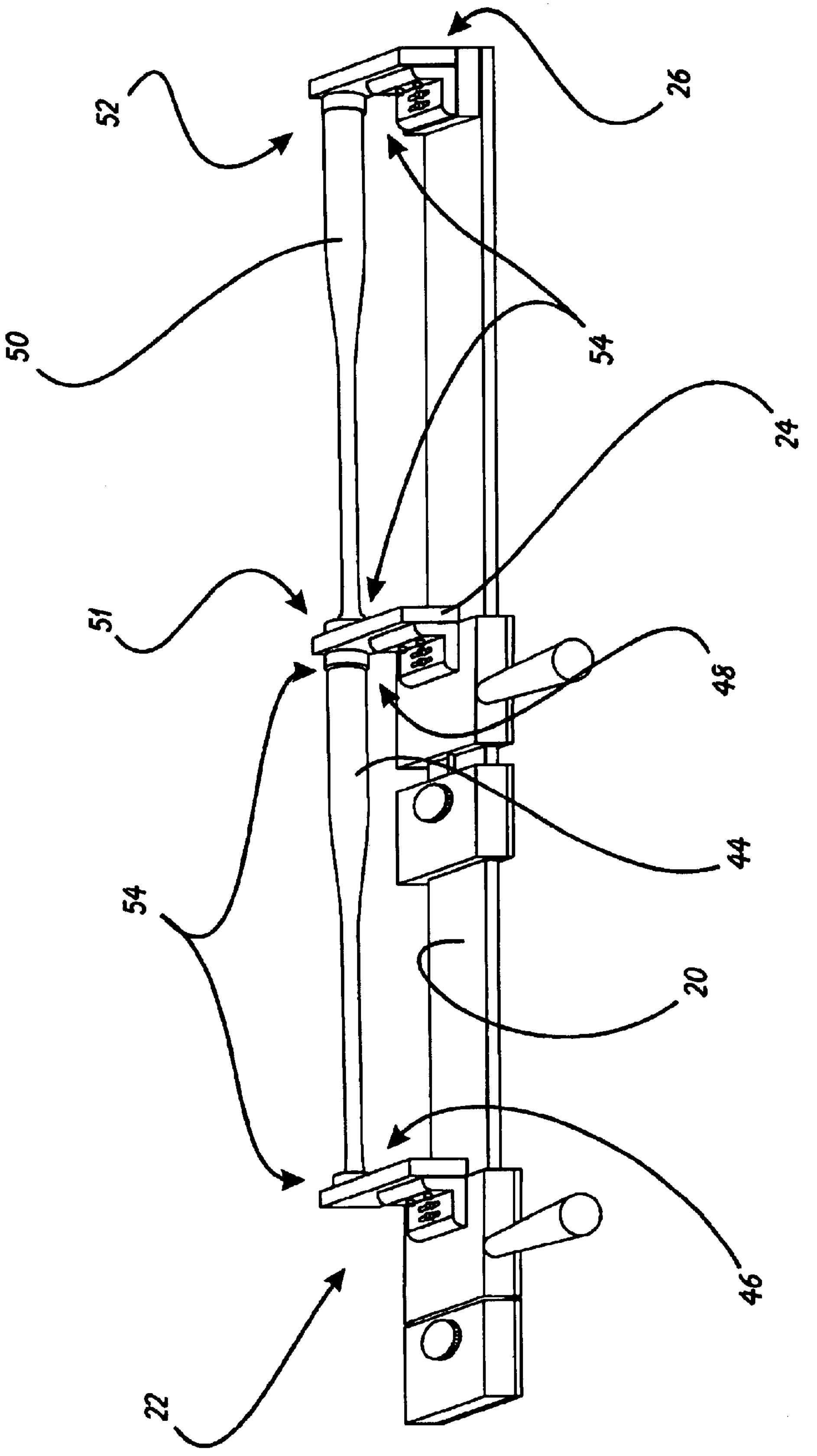
FIG. 4 is a front perspective view of the device of FIGS. 1–4.

FIG. 4 is a front perspective view of the device 18 of FIGS. 1–4. As shown, the first three-dimensional article 44 (shown here as a miniature baseball-bat-shaped figure) is held by holding cups 54 at its first end 46 and its second end 48. The first holding cup 54 (i.e. on the left) extends from the first end portion 22; the second holding cup (i.e. on the right) extends from the left side of the intermediate portion 24.

A second three-dimensional article 50 (also shown here as a miniature baseball-bat-shaped figure) is held at its first end 51 by a holding cup 54 extending from the right side of the intermediate portion 24 and also being held at its second end 52 by a holding cup 54 extending from the second end portion 26.

It should be clear that the two holding cups 54 extending from the intermediate portion 24 are attached to one another such that they rotate together. The result of this interconnection is that when the first three-dimensional article 44 rotates (i.e. when the drive means causes it to rotate), the second three-dimensional article 50 will also be driven to rotate. In order to focus on the drive mechanism, we shall now turn to FIG. 5.

Figure 5:
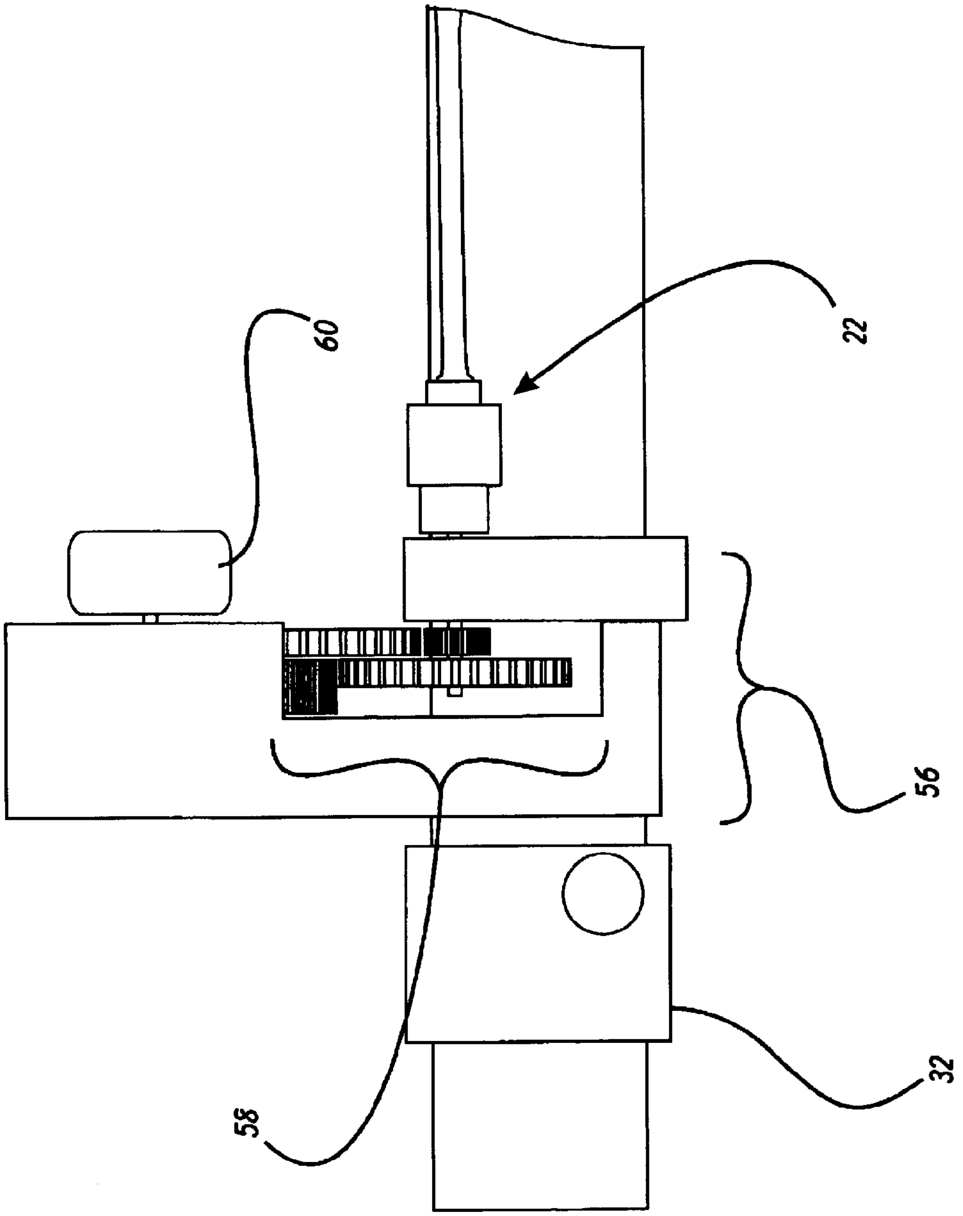
FIG. 5 is a top view of a preferred drive means of the present invention.

FIG. 5 is a top view of a preferred drive means 56 of the present invention. The drive means 56 could be created from a variety of conventional motor and gear arrangements that are adequate to provide steady, predictable rotation at the desired rate of speed. In this embodiment, the drive means 56 comprises a motor 60 for driving the plurality of interconnected drive gears 58. Once the rotation has been stepped down to its desired velocity and resolution, the rotational output drives the holding cup 54 to rotate (and therefore to rotate the first three-dimensional article). If we finally turn to FIG. 6, we can examine a further novel and nonobvious advancement of the present invention.

Figure 6:
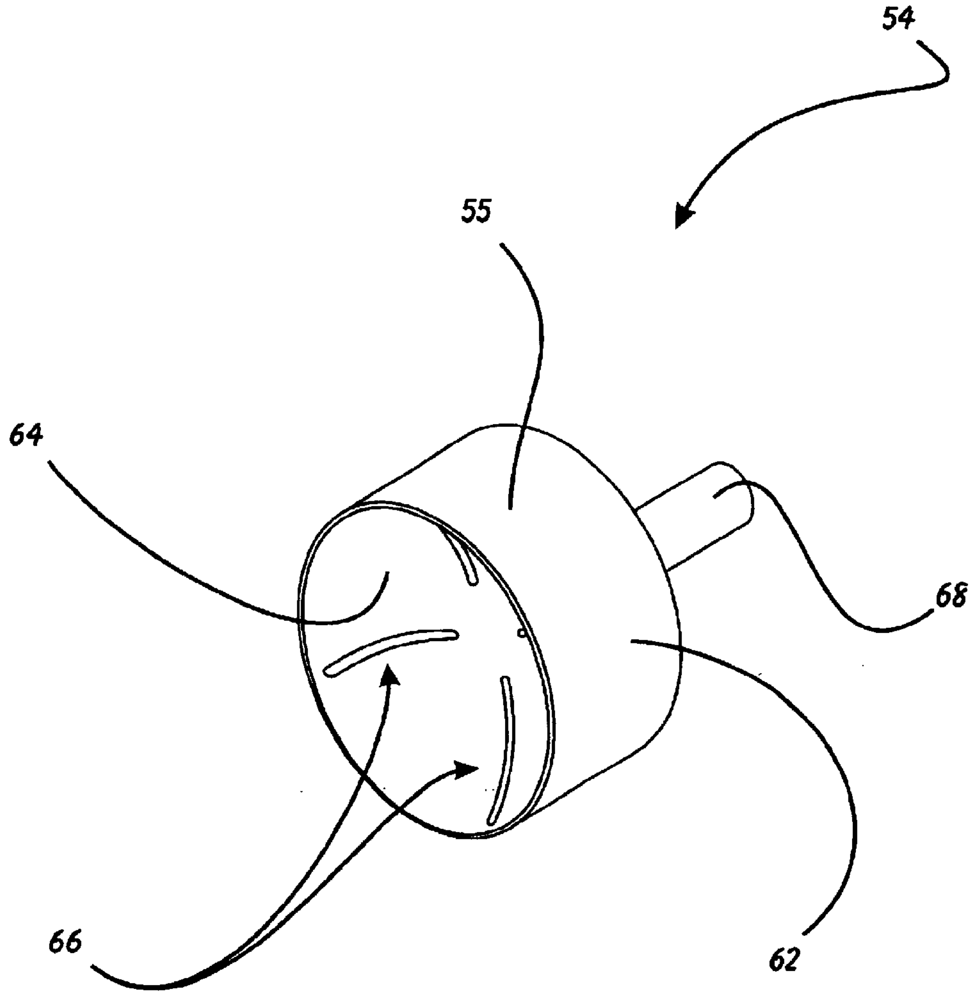
FIG. 6 is a perspective view of a holding cup of the device of FIGS. 1–5.

FIG. 6 is a perspective view of a holding cup 54 of the device of FIGS. 1–5. As shown, the holding cup 54 comprises a body 55 from which a shaft 68 extends. The body 55 defines a generally circular outer peripheral surface 62 and a generally concave inner surface 64. As discussed at length in the parent to this application, the ends of the three-dimensional article(s) are held in place by the inner surface of the holding cup 54. What is truly unique is the projection of one or more ridges 66 from the inner surface 64. These ridges 66 create a more positive rotational connection between the holding cup and the three-dimensional articles than if the inner surface 64 was left smooth (as was disclosed in the parent to this application). Furthermore, while the ridges 66 will provide substantial friction against rotation between the three-dimensional article and the holding cup 54, they will not prevent the three-dimensional article from dropping right out of the holding cup 54 when the biasing force (see FIG. 2) is relieved.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In combination with a modified microprocessor-based printer that produces copies of computer data based on printing instructions received from a host computer, said printer being of a character having a carriage which carries at least one ink jet cartridge for movement along the length of a print zone of the printer within a first plane and means for controlling firing of a nozzle of the ink jet cartridge, the improvement comprising positioning means for holding within the printer at least two three-dimensional articles, each article having a first end, a second end, a longitudinal axis and a non-planar surface upon which the computer data is to be imprinted, said positioning means functioning to controllably position the three-dimensional articles within the printer in a manner such that the longitudinal axis of the articles is at all times during the printing operation maintained within a second plane that is parallel to and spaced-apart from the first plane, said positioning means comprising a multiple-article positioning assembly mounted within the modified microprocessor based printer, said multiple-article positioning assembly comprising:

a first end portion including:

first gripping means for gripping the first end of one three-dimensional article, said gripping means comprising a first holding cup connected to said first end portion; and rotating means for controllably rotating one three-dimensional article relative to the ink jet cartridge;

a second end portion, including second gripping means for gripping a second end of a second three-dimensional article, said gripping means comprising a second holding cup connected to said second end portion; and an intermediate portion, including third gripping means for gripping a second end of said first three-dimensional article, said gripping means comprising a third holding cup connected to said second end of said first three-dimensional article.

2. The combination of claim 1, wherein said intermediate portion further includes fourth gripping means for gripping a first end of said second three-dimensional article, said gripping means comprising a fourth holding cup connected to said first end of said second three-dimensional article.

3. The combination of claim 2 wherein:

said holding cups are further defined by a substantially concave inner surface; and said gripping means comprise at least one ridge protruding from said inner surfaces of said holding cups.

4. The combination of claim 3, further comprising:

a guide in a plane that is in spaced relation and substantially parallel to said first plane;

a first carriage slidingly attached to said guide, said first end portion extending from said first carriage; and a first adjustment block assembly said first adjustment block assembly comprising a block slidingly attached to said guide, and a biasing device extending between said block and said first carriage.

5. The combination of claim 4, further comprising:

a second carriage slidingly attached to said guide, said intermediate portion extending from said second carriage; and a second adjustment block assembly, said second adjustment block assembly comprising a block slidingly attached to said guide, and a aligning peg extending therefrom and in sliding engagement with said second carriage.

6. The combination of claim 3, further comprising:

a guide in a plane that is in spaced relation and substantially parallel to said first plane;

a first carriage slidingly attached to said guide and further defined by a biasing device, said first end portion extending from said first carriage; and a first adjustment block assembly said first adjustment block assembly comprising a block slidingly attached to said guide, said biasing device extending between said block and said first carriage.

7. The combination of claim 6, further comprising:

a second carriage slidingly attached to said guide, said intermediate portion extending from said second carriage, said second carriage further defined by an aligning peg extending therefrom; and a second adjustment block assembly, said second adjustment block assembly comprising a block slidingly attached to said guide, said aligning peg in sliding engagement with said second adjustment block assembly.

8. A device for printing an image on a pair of three-dimensional articles, said printing device reproducing computer-based data in response to printing instructions received from a host computer, comprising:

a base;

a print head carriage assembly extending from said base, said print head carriage assembly comprising:

a print head for printing an image in a printing plane; and a print zone disposed on said printing plane;

a positioning assembly for positioning at least two three-dimensional articles, said positioning assembly comprising:

a guide attached to said base in parallel and spaced-apart relation to said printing plane;

a first end assembly comprising:

first gripping means for gripping the first end of one three-dimensional article, said gripping means comprising a first holding cup connected to said first end assembly; and rotating means for controllably rotating said first holding cup relative to said print head;

a second end assembly, comprising second gripping means for gripping a second end of a second three-dimensional article, said gripping means comprising a second holding cup connected to said second end assembly; and an intermediate portion, comprising third gripping means for gripping a second end of said first three-dimensional article, said gripping means comprising a third holding cup connected to said second end assembly of said first three-dimensional article.

9. The device of claim 8, further comprising:

a guide in a plane that is in spaced relation and substantially parallel to said first plane;

a first carriage slidingly attached to said guide, said first end portion extending from said first carriage; and a first adjustment block assembly said first adjustment block assembly comprising a block slidingly attached to said guide, and a biasing device extending between said block and said first carriage.

10. The device of claim 9, further comprising:

a guide in a plane that is in spaced relation and substantially parallel to said first plane;

a first carriage slidingly attached to said guide and further defined by a biasing device, said first end portion extending from said first carriage; and a first adjustment block assembly said first adjustment block assembly comprising a block slidingly attached to said guide, said biasing device extending between said block and said first carriage.

11. The device of claim 10, further comprising:

a second carriage slidingly attached to said guide, said intermediate portion extending from said second carriage, said second carriage further defined by an aligning peg extending therefrom; and a second adjustment block assembly, said second adjustment block assembly comprising a block slidingly attached to said guide, said aligning peg in sliding engagement with said second adjustment block assembly.

12. The device of claim 9, further comprising:

a second carriage slidingly attached to said guide, said intermediate portion extending from said second carriage; and a second adjustment block assembly, said second adjustment block assembly comprising a block slidingly attached to said guide, and a aligning peg extending therefrom and in sliding engagement with said second carriage.

13. The device of claim 12, wherein said intermediate assembly further includes fourth gripping means for gripping a first end of said second three-dimensional article, said gripping means comprising a fourth holding cup connected to said first end of said second three-dimensional article.

14. The device of claim 13 wherein:

said holding cups are further defined by a substantially concave inner surface; and said gripping means comprise a plurality of ridges extending radially outward from said inner surfaces of said holding cups.

15. A method for imprinting images on a portion of the surfaces of a pair of three-dimensional articles by using a modified microprocessor-based printer that includes control circuitry that functions to cause the printer to produce a copy of computer data based on printing instructions received from a host computer, the printer being of a character having a carriage which carries at least one ink jet cartridge having a nozzle for movement along the length of a print zone of the printer within a first plane and means for controlling the firing of a nozzle of the ink jet cartridge, the modified microprocessor-based printer comprising an article positioning assembly for holding the three-dimensional articles within the printer in a manner such that the longitudinal axis of the three-dimensional articles is at all times during the printing operation maintained within a second plane that is parallel to and spaced apart from the first plane, said method comprising the steps of:

analyzing the three-dimensional articles to determine the configuration of the portion of the surfaces thereon that is to be imprinted;

positioning the three-dimensional articles within the article positioning assembly;

rotating the three-dimensional articles about their longitudinal axes;

producing a non-distorted image;

distorting said non-distorted image in a manner to produce a distorted image that corresponds with the surfaces of the three-dimensional articles that are to be imprinted; and using the host computer, transmitting the printer instructions to the printer instructing the printer to fire the nozzle of the ink jet cartridge in a manner to print said distorted image on the rotating three-dimensional articles.

16. The method of claim 15, wherein said positioning and rotating steps further comprise positioning and rotating said pair of three-dimensional articles with positioning means comprising:

a first end portion comprising:

first gripping means for gripping the first end of one three-dimensional article, said gripping means comprising a first holding cup connected to said first end portion; and rotating means for controllably rotating one three-dimensional article relative to the ink jet cartridge;

a second end portion, including second gripping means for gripping a second end of a second three-dimensional article, said gripping means comprising a second holding cup connected to said second end portion; and an intermediate portion, including third gripping means for gripping a second end of said first three-dimensional article, said gripping means comprising a third holding cup connected to said second end of said first three-dimensional article.

17. The method of claim 16, wherein said positioning and rotating steps further comprise positioning and rotating said pair of three-dimensional articles with positioning means having said intermediate portion further comprising fourth gripping means for gripping a first end of said second three-dimensional article, said gripping means comprising a fourth holding cup connected to said first end of said second three-dimensional article.

18. The method of claim 17, wherein said positioning and rotating steps further comprise positioning and rotating said pair of three-dimensional articles with said positioning means further comprising:

a guide in a plane that is in spaced relation and substantially parallel to said first plane;

a first carriage slidingly attached to said guide, said first end portion extending from said first carriage; and a first adjustment block assembly said first adjustment block assembly comprising a block slidingly attached to said guide, and a biasing device extending between said block and said first carriage.

19. The method of claim 18, wherein said positioning and rotating steps further comprise positioning and rotating said pair of three-dimensional articles with said positioning means further comprising:

a second carriage slidingly attached to said guide, said intermediate portion extending from said second carriage; and a second adjustment block assembly, said second adjustment block assembly comprising a block slidingly attached to said guide, and a aligning peg extending therefrom and in sliding engagement with said second carriage.

20. The method of claim 19, wherein said positioning and rotating steps further comprise positioning and rotating said pair of three-dimensional articles with said positioning means further comprising:

said holding cups further defined by a substantially concave inner surface; and said gripping means further comprise a plurality of ridges extending radially outward from said inner surfaces of said holding cups.

* * * * *